United States Patent
Choe

(10) Patent No.: US 11,658,928 B2
(45) Date of Patent: May 23, 2023

(54) VIRTUAL CONTENT CREATION METHOD

(71) Applicant: Kab Cheon Choe, Seoul (KR)

(72) Inventor: Kab Cheon Choe, Seoul (KR)

( * ) Notice: Subject to any disclaimer, the term of this patent is extended or adjusted under 35 U.S.C. 154(b) by 406 days.

(21) Appl. No.: 16/987,738

(22) Filed: Aug. 7, 2020

(65) Prior Publication Data
US 2021/0264221 A1 Aug. 26, 2021

(30) Foreign Application Priority Data
Feb. 26, 2020 (KR) ........................ 10-2020-0023303

(51) Int. Cl.
  *H04L 51/10* (2022.01)
  *G06N 20/00* (2019.01)
  *G10L 25/63* (2013.01)
  *H04L 51/04* (2022.01)
  *G06F 18/243* (2023.01)
  *G06F 18/214* (2023.01)

(52) U.S. Cl.
  CPC ............ *H04L 51/10* (2013.01); *G06F 18/214* (2023.01); *G06F 18/243* (2023.01); *G06N 20/00* (2019.01); *G10L 25/63* (2013.01); *H04L 51/04* (2013.01)

(58) Field of Classification Search
  CPC .... G06K 9/6279; G06K 9/6256; G06N 20/00; G10L 25/63; H04L 51/04; H04L 51/10
  USPC .......................................................... 706/12
  See application file for complete search history.

(56) References Cited

U.S. PATENT DOCUMENTS

| | | | | |
|---|---|---|---|---|
| 11,140,360 | B1* | 10/2021 | Kasaba | ................ G06V 40/174 |
| 2010/0083320 | A1* | 4/2010 | Roberts | .............. H04N 21/4782 704/E21.001 |
| 2014/0222432 | A1* | 8/2014 | Ahn | .................... G10L 15/1822 704/275 |
| 2019/0095775 | A1* | 3/2019 | Lembersky | ............ G06N 3/006 |
| 2020/0035215 | A1* | 1/2020 | Yang | ....................... G10L 25/63 |

FOREIGN PATENT DOCUMENTS

KR         1925440 B1 * 12/2018  ............... G06N 3/08

* cited by examiner

*Primary Examiner* — Nicholas R Taylor
*Assistant Examiner* — Chong G Kim
(74) *Attorney, Agent, or Firm* — The PL Law Group, PLLC

(57) ABSTRACT

A virtual content creation method according to an embodiment of the present invention includes, by a server, receiving a model content including at least one of a text, an SMS, a voice-recorded MP3 file, a picture, and a video of a model; by the server, extracting a model feature including at least one of a text feature, a voice feature, an image feature, and a video feature from the model content; and when a user wants to communicate with the model, by the server, being operated based on deep learning or artificial intelligence to allow the user to input a user content to the server, determine a user state by detecting an emotional state of the user from the user content, and transform the model content into the virtual content using the model feature or the user state.

8 Claims, 2 Drawing Sheets

VIRTUAL CONTENT CREATION METHOD

CROSS-REFERENCE TO RELATED APPLICATION

This application claims the benefit under 35 USC § 119(a) of Korean Patent Application No. 10-2020-0023303, filed on Feb. 26, 2020, in the Korean Intellectual Property Office, the entire disclosure of which is incorporated herein by reference for all purposes.

BACKGROUND

1. Field

The present invention relates to a method of creating a virtual content of a model on the basis of back data of the model using artificial intelligence.

2. Description of Related Art

A user wants to receive real-time consultation with a model who he/she likes or to communicate with the model. In the related art, when the user cannot access the model in close proximity, there has been no way to provide a model content in a customized manner according to a user's environment.

SUMMARY

The present invention has been made keeping in mind the above problems occurring in the related art, and an object of the present invention is to provide a method of implementing, according to a user's environment, at least one of a text, voice, and video of a model that is difficult for a user to access.

According to the present invention, a method of creating a virtual content includes: by a server, receiving a model content including at least one of a text, an SMS, a voice-recorded MP3 file, a picture, and a video of a model; by the server, extracting a model feature including at least one of a text feature, a voice feature, an image feature, and a video feature from the model content; and when a user wants to communicate with the model, by the server, being operated based on deep learning or artificial intelligence to allow the user to input a user content to the server, determine a user state by detecting an emotional state of the user from the user content, and transform the model content into the virtual content using the model feature or the user state.

When the user is in a particular situation, sad, happy, troubled, or at the moment of choice, the user can get help or advice from the model.

In the case that the user has a difficulty in communicating with the model because the model is out of reach, or is in a remote position, an original data of the model in which video and audio are stored directly by the model can be reproduced as it is or recombined into other content when the user desires the original data.

Accordingly, it is possible to overcome a problem that the communication method is one-sided, a problem of one-sided expression of the model, a problem that the user and the model cannot communicate with each other, and a problem that the user cannot ask the model for advice.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
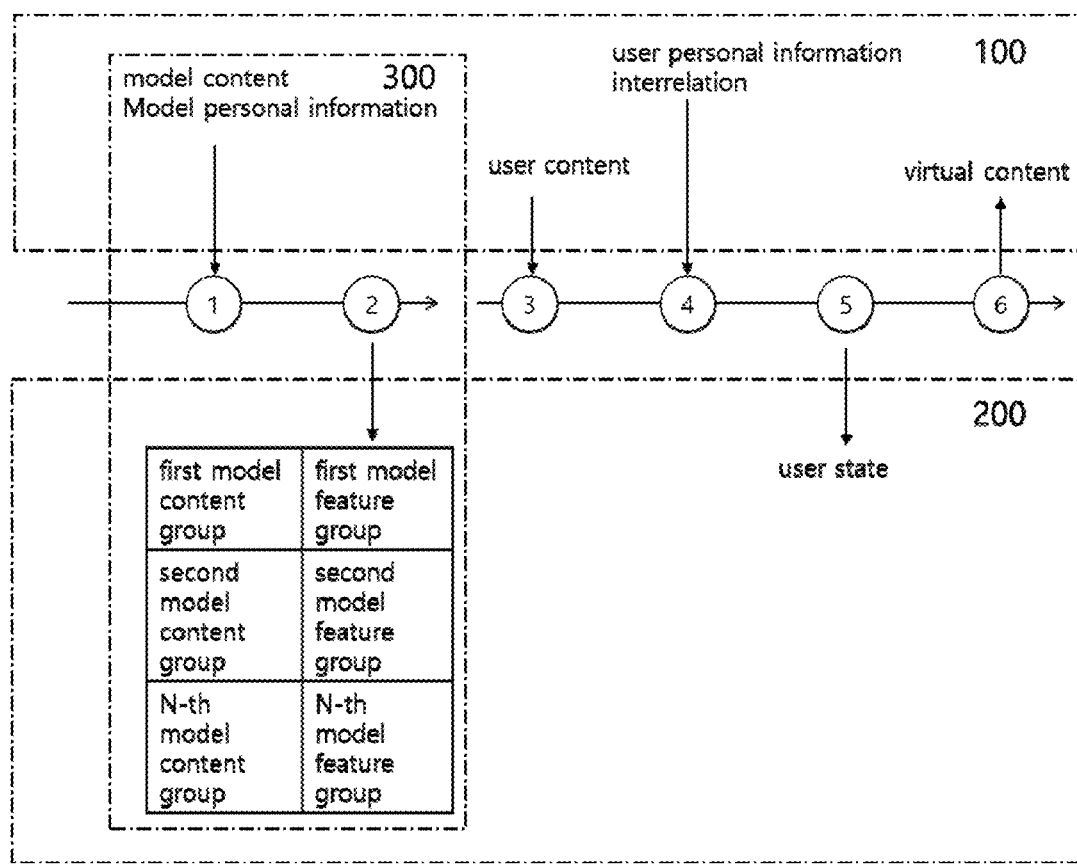
FIG. 1 is a flow chart showing a virtual content creation method in time series according to the present invention.

A user wants to share his/her precious memories with person who he/she likes. In addition, the user wants to communicate with the person whenever he/she wants.

The user often thinks of deceased people, parents, family, lovers, etc., as persons who influence him/her or persons he/she admires. The user has good memories of his/her warm and comforting parents or spouses. Hereinafter, a "model" may be at least one of a soul model, a deceased person who a user wants to remember, a surviving role model, a mentor, a deceased parent, a surviving parent, a spouse, family, lovers, friends, and pets.

When a user is in a particular situation, sad, happy, troubled, or at a moment of choice, he/she wants to get help or advice from the model and expects to hear a word of warmth. However, when the model is out of reach, or in a remote position, it is difficult to communicate therewith.

As a comparative example, it is possible to reproduce content data of image and audio stored at the time of survival of the model as it is when the user desires. However, there may be a problem that the communication method is one-sided, a problem of one-sided expression of the model, a problem that the user and the model cannot communicate with each other, and a problem that the user cannot ask the model for an advice.

A server of the present invention may use deep learning technology or artificial intelligence.

In the first step, the server may receive model content or model personal information.

The model content may include at least one of a document, an SMS, a voice, a picture, and a video associated with the model.

The model personal information includes at least one of a name, a nationality, gender classification, age, occupation, race, address, favorite food, and favorite color of the model, excluding the model content.

In the second step, the server may extract model features including at least one of a text feature, an SMS feature, a voice feature, an image feature, and a video feature from the model content.

When only one type of model feature exists in the model content, the only one model feature may be extracted for one model content. For example, there may be a case in which a voice of a model is extracted as a model feature from model content obtained by recording a phone voice of the model. Herein, the server may extract the voice itself as a model feature without discriminating between a happy voice and a sad voice.

Meanwhile, when several types of model features exist in the model content, a plurality of model features may be extracted for one model content. For example, when extracting the expression of the model from a picture of a model, the server may extract a happy facial expression when it is judged that a picture is taken when the model is happy, and extract a sad facial expression when it is judged that the picture is taken when the model is sad.

When multiple model features are extracted, it is necessary to classify the model features into groups. That is, the server may discriminate between happy and sad expressions and then extract each expression as a model feature for each group.

The server classifies the model contents into groups, and may classify the model contents into first model content group to N-th model content group. Here, N is a natural number, in which there may be one model content, or there may be two or more model contents.

The server may classify the model features into groups, and classify the model features into the first model feature group to the N-th model features group.

The group which is a criteria for distinguishing the first model content group to the Nth model content group, or the first model feature group to the Nth model feature group between each other may include at least of a model's emotion (for example, a picture of a model with happy expression and a picture of a model with sad expression) or a model's age (for example, a picture of a model who is young and a picture of an model who is old).

The server may define a state in which the model is happy as the first group, and a state in which the model is sad as the second group. The server may classify the group into a first model content group when the picture (content) is taken in the young age of the model and a second model content group when the picture (content) is taken in the old age of the model.

The server may analyze various model contents to divide the model contents into a first model content group corresponding to the first group which is young and a second model content group corresponding to the second group which is old.

The server may refer to model personal information (for example, age of a model, gender classification, and interaction with a user) to classify the model contents for each group.

When the model feature is extracted from the first model content group, it may be the first model feature group. When a model feature is extracted from the second model content group, it may be the second model feature group. The server may refer to model personal information (for example, age of a model, gender classification, and interaction with a user) to extract the model features for each group.

The following describes model matching and group matching.

The server may calculate a model matching degree to determine whether the model content or the model feature is associated with a specific model.

When classifying the model content or model feature into each group, the server may calculate the group matching degree to determine the classification accuracy.

For example, in the case that a model content is a picture in which several people including a model are taken while smiling, when model personal information is associated with his/her thirties, only a part corresponding to the model in his/her thirties is extracted and then classified into the first model feature group (smiling) of the corresponding model (in his/her thirties). In order to extract the model features corresponding to the model in his/her thirties, the model matching degree may be calculated using the model personal information in his/her thirties. After extracting the model content, the server may calculate the model matching degree to determine whether the model content corresponds to the model by referring to model personal information. When the model matching degree is equal to or higher than a reference value, it may be determined that the model content or model feature is correctly extracted.

In addition, the group matching degree may be calculated to determine whether a picture is associated with a smiling expression and corresponds to the first model content group. When the group matching degree is equal to or higher than a reference value, it may be determined that the group classification is correctly performed.

The server may classify the model content into groups, refer to model personal information when classifying, and calculate group matching to determine whether the classified model content belongs to the corresponding group. The server may classify the model content into the first model content group and the second model content group, the classification criteria being based on model personal information, and may calculate the group matching degree to determine whether the model content corresponds to the first model content group. When the model matching degree or the group matching degree is greater than or equal to a reference value, the server may confirm that the model content or model feature is accurate information that matches the model personal information.

When extracting model features from the classified model content, the server may classify the model features into groups. The server may refer to the model personal information to classify the model features into each group.

For example, when the server receives a smiley picture of the model as an input model content, the server may classify the picture into the first group because the picture is a smiley picture. An image around a smiling lip and smiling eyes, as a feature point in the smiley picture, may be extracted as the first model feature group.

Herein, the model personal information is referred to determine whether a gender of the model in the picture is male or female and whether the model is in his/her twenties or sixties. When the model is a woman in her twenties, it is possible to extract, as the first model feature group of the model, a portion of the picture in which she sweeps her long hair by hand.

In the third step, the server may receive a user content. The user content may include at least one of a document, an SMS, a voice, a picture, and a video associated with a user.

In the fourth step, the server may receive user personal information or an interrelation.

The user personal information may mean all personal information about the user, including, for example, gender, age, occupation, race, address, favorite food, and favorite color of the user, and interrelation with the model, excluding from the user content.

The interrelation may be defined as a relationship between the user and the model. The interrelation may mean a mutual relationship with a deceased person who the model admires, a surviving role model, a mentor, a deceased parent, a surviving parent, a spouse, a family member, a lover, a friend, or a pet.

The interrelation may be directly input by the user to the server, may be calculated by the server by matching user personal information to the model personal information, or may be a constant value recorded in the user login information.

In the fifth step, the server refers to the user personal information to determine a user state from the user content. The user state may be identified from at least one of a user's emotion, a user's desire, a user's conversation intention, a user's login time, a user's server usage frequency, and a user's past conversation.

In the sixth step, the server may create a virtual content matching the user state. The virtual content may be displayed on the terminal in an interactive manner, together with the user content.

Figure 2:
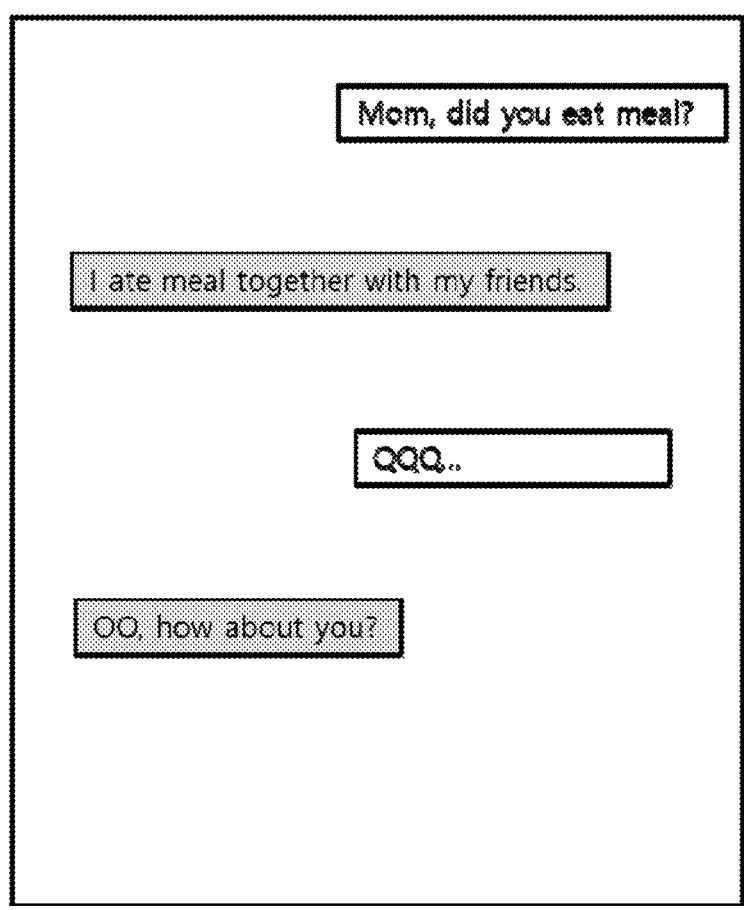
FIG. 2 is a view showing that a user content and a virtual content are displayed via an interactive SMS in a terminal according to the present invention.

Referring to FIG. 2, the server 200 may determine that a user is in a normal state and that the user desires a normal conversation. The server 200 may create a virtual content matching the normal state to output the same on the terminal. The virtual content and the user content input by the user may be displayed in an interactive manner on the terminal 100.

The server 200 may select at least one from the first model feature group to the Nth model feature group matching the user state, and create the virtual content as a new model content matching the selected model feature group.

The user content and the virtual content may be displayed in an interactive manner on the terminal 100.

Referring to FIG. 1, at least one of a model content input to the server 200, model personal information input to the server 200, a model content classified by the server 200, and a model feature classified by the server 200 may be stored in the storage unit 300.

The server 200 may receive the model contents or the model personal information before entering the user content, and classify the model contents or the model features into groups in advance to store the same in the storage unit 300.

When the user content is input, the server 200 may use the model features stored in the storage unit 300 to find a model feature matching the user state, and create a virtual content in an interactive manner on the basis of the model feature.

Since the communication is performed in an interactive manner using the user content and the virtual content, the server 200 may continue to perform learning while receiving the communication result. The server 200 continuously updates at least one of the model content, the model feature, and the user status, and retransforms the virtual content into another virtual content. That is, the communication result becomes another parameter, so that optimization of the virtual content may be continuously performed even during mutual communication.

When the user wants to communicate with the model, the server 200 is operated using deep learning or artificial intelligence, so that the user state may be repeatedly updated, and the model content may be repeatedly updated to the virtual content according to the user state.

The user may emotionally feel stable and comfortable while communicating with the model using the user content and the virtual content obtained by updating the model content in an interactive manner.

The text may include at least one of letter, characters, documents or records that may be displayed through a storage medium. The voice may include at least one of a sound, a song, a hum, and all sounds audible to the ear. The image may include at least one of a shape, a face, a body, and activity. The video may be a combination of voice and moving pictures.

The artificial intelligence provided in the server 200 may extract at least one of text, voice, and image from the model content and recombine the virtual content according to a user state.

The model content, including images and voices of a model in his/her living years, may be processed into the virtual content using artificial intelligence (AI). The model content may provide the user with contextual communication, SMS, voice call, image transmission, video call, etc., which results in giving the user happiness.

For the remaining family members, the model may allow his/her model features to be trained in an artificial intelligence based server 200 before a first time point when the user content is input.

The server 200 may directly learn user content or user personal information and communicate with a user on behalf of the model. Recently, the number of people living alone is increasing, and many people feel lonely. For these people, model's information or user's own information may be pre-trained in the server 200, so that a conversation suitable for a user's emotional state may be performed. The interactive AI currently available by telecommunication companies in the related art is only capable of simple reproduction of a user's output command.

When the model content is a character, a character recognition model that recognizes a model feature from the model content automatically reads or identifies printed or handwritten characters, so that the mode content may be transformed to a code capable of being understood by the server 200.

When the model content is an image or a video, a deepfake model may recombine an image or video on at least one of a face, body, and shape of a specific model into a virtual content using artificial intelligence or artificial intelligence algorithms.

The model features, including at least one of a tone, intonation, and reading by punctuating of the model, are learned by the artificial intelligence, so that the model content may be combined or modified according to the model feature to create the virtual content that is customized to the situation.

Learning data for the model is collected as follows.

The server 200 may collect or learn the conversational voices, faces, texts, etc. of the model, when the model is alive or before the model dies. As the learning data of the server 200 increases, the accuracy of the data increases.

To this end, it is possible to collect the learning data of the model by distributing its own app, opening a web page, and so on.

The service method of the server 200 for the user is as follows.

The user may utilize a smartphone application or web page connected to the server 200. The user may send an SMS or make a call or video call using the application connected to the server 200. The user may communicate with the model through an appearance, intonation, and voice of the model desired by the user.

The charging method of the server 200 may be calculated as a rate per one time for SMS and a rate per 30 seconds for a call or a video call.

When providing a user service of the server 200, the following may be considered. The service quality of the server 200 may be varied according to the data collection amount for the model. Since it is possible to provide the model content at a level capable of basic life dialogue, the user can talk with the model or the deceased, having a longing heart. However, the server 200 cannot provide a dialogue at a high level such as politics or economy.

What is claimed is:

1. A method of creating a virtual content, the method comprising:
   by a server, receiving (i) a model content including at least one of a text, a message, a voice-recorded MPEG Audio Layer III (MP3) file, a picture, and a video of a model, and (ii) a model personal information including at least one of a name, a nationality, gender classification, age, occupation, race, address, favorite food, and favorite color of the model, excluding the model content;

by the server, extracting a model feature including at least one of a text feature, a voice feature, an image feature, and a video feature from the model content;

by the server, receiving a user content including at least one of a document, a message, a voice, a picture, and a video associated with the user;

by the server, receiving (i) user personal information including at least one of gender, age, occupation, race, address, favorite food, and favorite color of the user, excluding from the user content, and (ii) an interrelation which is a relationship between the user and the model, wherein the interrelation is calculated by the server by matching the user personal information to the model personal information;

by the server, referring to the user personal information to determine a user state from the user content; and by the server, creating a virtual content matching the user state; and displaying the virtual content on a user terminal in an interactive manner together with the user content, when a user wants to communicate with the model, by the server, being operated based on deep learning or artificial intelligence to allow the user to input the user content to the server, determine the user state by detecting an emotional state of the user from the user content, and transform the model content into the virtual content using the model feature, the user state and the interrelation.

2. The method of claim 1, wherein communication is performed using the user content and the virtual content in an interactive manner; and the server receives the communication result and updates at least one of the model content, the model feature, and the user state to re-transform the virtual content into another virtual content and output the same to the user terminal.

3. The method of claim 1, wherein the text includes at least one of letters, characters, or a record capable of being displayed through a document or a storage medium;

the voice includes at least one of a sound, a song, a hum, and all sounds audible to the ear, the image includes at least one of a shape, a face, a body, and activity; and the artificial intelligence provided in the server extracts the model features related to at least one of the text, the voice, and the image from the model content and recombines the virtual content according to the user state.

4. The method of claim 1, wherein, when the model content is the text, and the text is printed or handwritten, the server transforms the text printed or handwritten into a code capable of understandable by the server via automatic read-out or identification using a text recognition model recognizing the model feature; and the server recombines at least one image or video of a face, a body, or a shape of the model into the virtual content using the artificial intelligence, when the model content is the image or video.

5. The method of claim 1, wherein the server classifies the model content or the model feature into groups;

the server classifies the model content into a first model content group to a N-th model content group where N is a natural number, or classifies the model features into a first model feature group to a N-th model feature group; and the server refers to model personal information or user personal information to classify the model content or the model feature into each group.

6. The method of claim 1, wherein the server calculates a model matching degree to determine whether the model content or model features correspond to a specific model, and confirms that the model content or the model feature is accurate when the model matching degree is equal to or greater than a reference value.

7. The method of claim 1, wherein when the server classifies the model content or the model feature into groups, the server calculates a group matching degree to determine classification accuracy, and when the group matching degree is greater than or equal to a reference value, and confirm that the model content or the model feature is accurate information matching model personal information.

8. The method of claim 1, wherein before inputting the user content, the server receives the model content or model personal information, and classifies the model content or the model feature into groups to store the same in a storage unit; and when the user content is input, the server extracts the model feature matching the user state by using the model feature stored in the storage unit, and creates the virtual content in an interactive manner on the basis of the extracted model feature.

* * * * *